United States Patent

Foldesi et al.

[11] Patent Number: 5,871,788
[45] Date of Patent: Feb. 16, 1999

[54] PUNCH AND DIE ASSEMBLY FOR CLOSURE LINER INSERTION DEVICE

[75] Inventors: Steven Foldesi; Steven Foldesi, Jr., both of Shelburne, Vt.

[73] Assignee: Nestech Machine Systems, Inc., Hinesburg, Vt.

[21] Appl. No.: 679,300

[22] Filed: Jul. 12, 1996

[51] Int. Cl.⁶ .............................. A01J 21/02; B26F 1/14
[52] U.S. Cl. .................... 425/809; 264/153; 425/289; 83/686; 83/733
[58] Field of Search ........................ 425/809, 289; 264/153; 83/686, 687, 733, 684, 692

[56] References Cited

U.S. PATENT DOCUMENTS

| | | | |
|---|---|---|---|
| 2,851,727 | 9/1958 | Wilckens et al. | 425/809 |
| 2,881,475 | 4/1959 | Wilckens | 425/809 |
| 2,954,585 | 10/1960 | Simpson | 425/809 |
| 2,999,531 | 9/1961 | Acton | 425/809 |
| 3,366,723 | 1/1968 | Green | 425/809 |
| 4,336,011 | 6/1982 | George et al. | 425/809 |
| 5,190,769 | 3/1993 | Murayama | 425/809 |

FOREIGN PATENT DOCUMENTS

| | | | |
|---|---|---|---|
| 168437 | 9/1921 | United Kingdom | 425/809 |
| 159167 | 1/1922 | United Kingdom | 425/809 |

*Primary Examiner*—M. Rachuba
*Assistant Examiner*—Sean A. Pryor
*Attorney, Agent, or Firm*—Charles E. Temko

[57] ABSTRACT

An improved punch and die assembly for use with a closure liner insertion device is disclosed. As contrasted with prior art construction, the assembly is supported upon a pair of vertically oriented posts located adjacent the periphery of a rotating dial, the vertical axis of each post lying in a vertical plane passing through the vertical axis of the punch and corresponding die. This construction permits installation of a standard punch and die unit in conjunction with closure liner insertion machines of varying dimensions, without substantial alteration.

3 Claims, 3 Drawing Sheets

5,871,788

PUNCH AND DIE ASSEMBLY FOR CLOSURE LINER INSERTION DEVICE

BACKGROUND OF THE INVENTION

This invention relates generally to the field of closure liner insertion machines employed to place a planar deformable liner into a container closure or cap for the purpose of providing a compressible seal against the mouth of a container to which the closure is applied. Typical are threaded caps formed of synthetic resinous material having an internally threaded side wall which mates with a corresponding external thread on a container finish, although the invention has application to other types of closures as well.

In the typical container liner insertion machine of this type, it is known to employ a rotating dial having incremental advancement means and having peripherally spaced pockets which receive individual closures to pass them beneath a liner forming and seating device, and subsequently discharge the lined cap for further processing. The liner forming and seating structure normally includes a punch and corresponding die between which a continuous web of lining material is fed in increments. At a predetermined instant when the movement of the dial is interrupted, the die descends to cut a circular liner from the web and pass it through the die to seat the now cut liner in the closure against the inner surface of an end wall thereof to be secured either frictionally, or by use of a previously applied adhesive. In the prior art, the punch and die assembly has been supported upon posts or other structure which spans the dial, making necessary either an adjustable fixture, or a horizontal support element carried by the posts of varying sizes to enable installment upon the structure carrying the dial. Because dials of varying dimensions are widely used in the industry, installation of a single size punch and die structure presents a problem.

SUMMARY OF THE INVENTION

Briefly stated, the invention contemplates the provision of an improved punch and die assembly of the type described in which the above-mentioned problem of installation has been resolved. To this end, the punch and die assembly is supported in cantilever fashion upon a pair of supporting posts which are positioned on a single side of the punch and die element, so that no component part of the same need extend over more than the periphery of the dial in the arcuate area where the closure receiving pockets are positioned. As in the prior art, the punch and die element is operated in synchronism with the incremental rotation of the dial, and certain of the motion transmitting components of the punch and die element are also supported from the above-mentioned posts.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
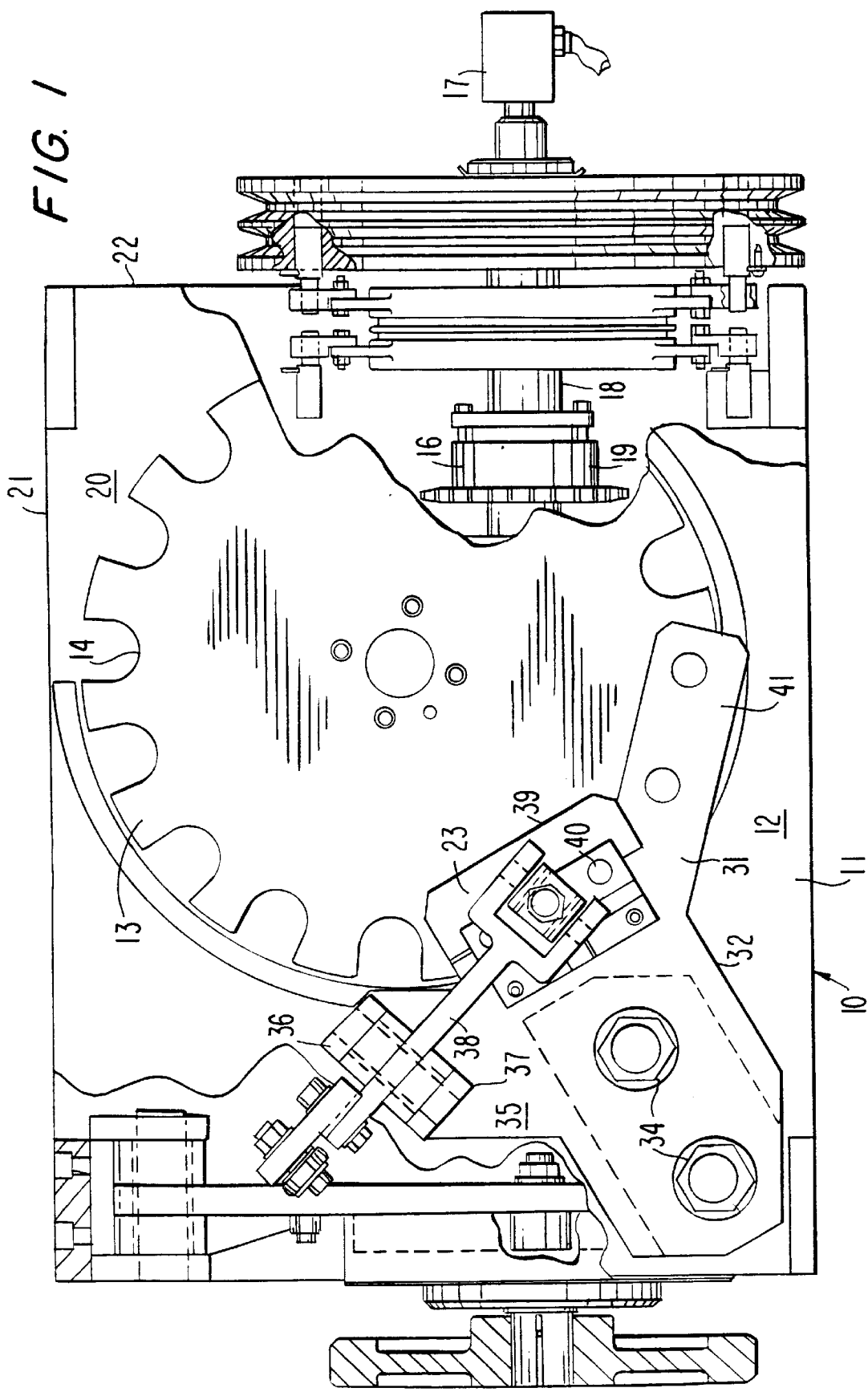
FIG. 1 is a schematic top plan view of an embodiment of the invention.

In accordance with the invention, the device, generally indicated by reference character 10, includes a known closure lining machine. Such devices serve to place a compressible liner usually formed of fibrous material within a molded closure to complete the manufacture of the same. Such closures normally include a planar end wall and a cylindrical side wall having internal threads which engage corresponding threads on an outer surface of a neck or finish of a mating container, wherein the liner contacts the mouth of the finish to effect a sealing action. Such devices usually include a rotating dial, the periphery of which forms closure retaining pockets which receive closures and advance them incrementally to a station where the liner is inserted, and subsequently move the closure to a discharge point. Liners can be formed and fed to the station where they are inserted, but it is usually more convenient to form the liners individually from a web of material which is fed to the point of liner placement where a punch and die element cut the liner, the punch moving through the die to then place the liner in position against the inner surface of an end wall of the cap. Depending upon production requirements, and other considerations, the dial may be of relatively small or large diameter, and in the prior art, there has existed the above-mentioned problem of installation of the punch and die element to position the same for the above-described operation. In the prior art, the punch and die element is normally supported at at least two points by a mounting member which spans at least a portion of the dial.

Referring to FIG. 1 in the drawing, the device 10 includes a horizontal platform 11 having an upper surface 12 forming a recess in which a rotating dial 13 is positioned. The dial includes pockets 14 for receiving closures (not shown) and is moved incrementally by dial driving means 16 including a prime mover 17 which transmits motion through a horizontally engaged main shaft 18 controlled by known cam-type timing means 19. A recess 20 in the platform 11 provides an entrance gate 21 and an exit gate 22 for the entry and exit of closures which move past a single liner insertion station 23.

Figure 2:
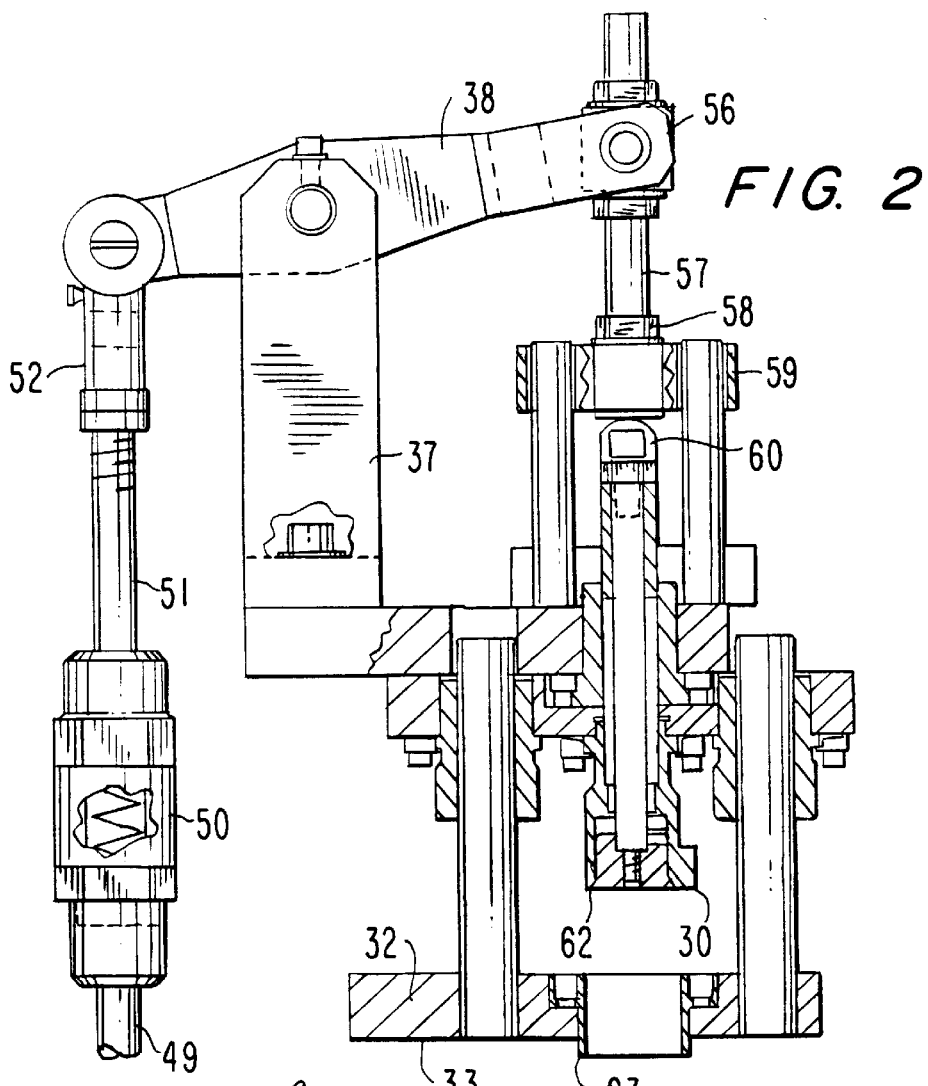
FIG. 2 is a fragmentary schematic side elevational view thereof.

Referring to FIG. 2, the insertion of the liner is performed by a punch and die assembly 30 positioned adjacent the periphery of the dial 13. It includes a mounting bracket element 31 having a main body 32 forming a base plate, a lower surface 33 of which is secured to the surface 12 by a pair of bolts 34. Extending from the main body is a first extension support 35 anchoring first and second brackets 36 and 37 supporting a rocker arm 38. A second extension 39 supports an orificed plate 40, while a third extension 41 supports known web supply means (not shown).

Figure 3:
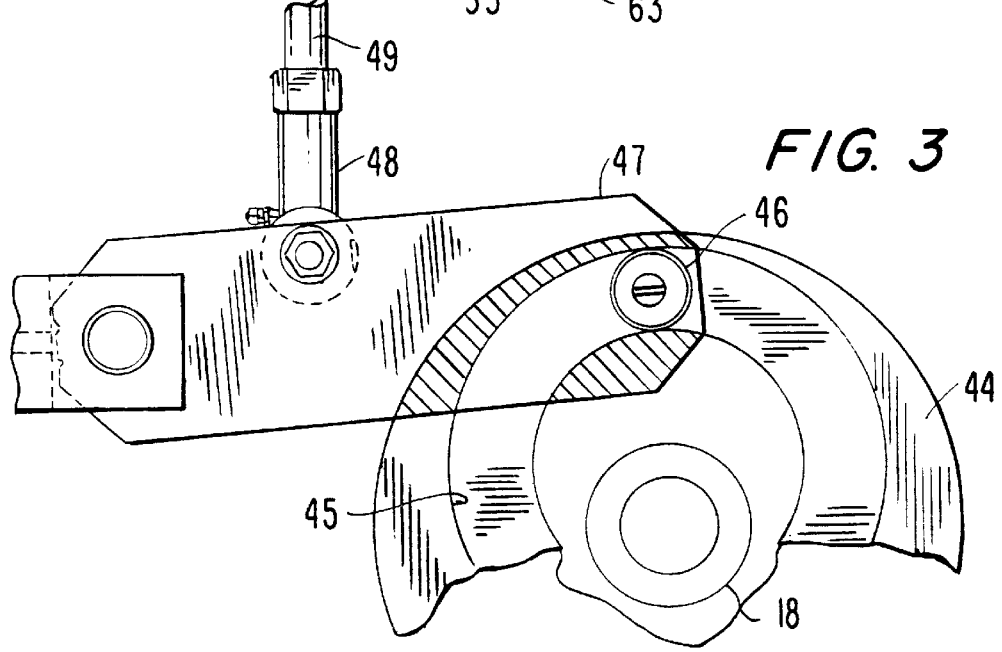
FIG. 3 is a fragmentary schematic side elevational view showing the structure beneath that shown in FIG. 2.

Referring to FIG. 3, a cam plate 44 is driven indirectly from the shaft 18 and forms an eccentric cam 45 driving a follower 46 on a pivotally mounted link 47. Positioned medially on the link is a spring housing 48 enclosing the lower end of a lower connecting rod 49. The upper end of the rod interconnects with a second spring housing 50 in turn connected to an upper connecting rod 51, the upper end of which engages another pivotally mounted spring housing 52 on one end of the rocker arm 38. The opposite end thereof is pivotally interconnected to a collar 56 on a vertical rod 57, a lower end 58 of which passes through a guide 59 to contact the upper end of a plunger 60. The lower end thereof, in turn contacts a punch 62 which coacts with a die 63 to form individual liner inserts. The operation of the punch and die an its coaction with liner material web feeding means is well-known in the art, and the details of the same are outside the scope of the present disclosure.

Figure 4:
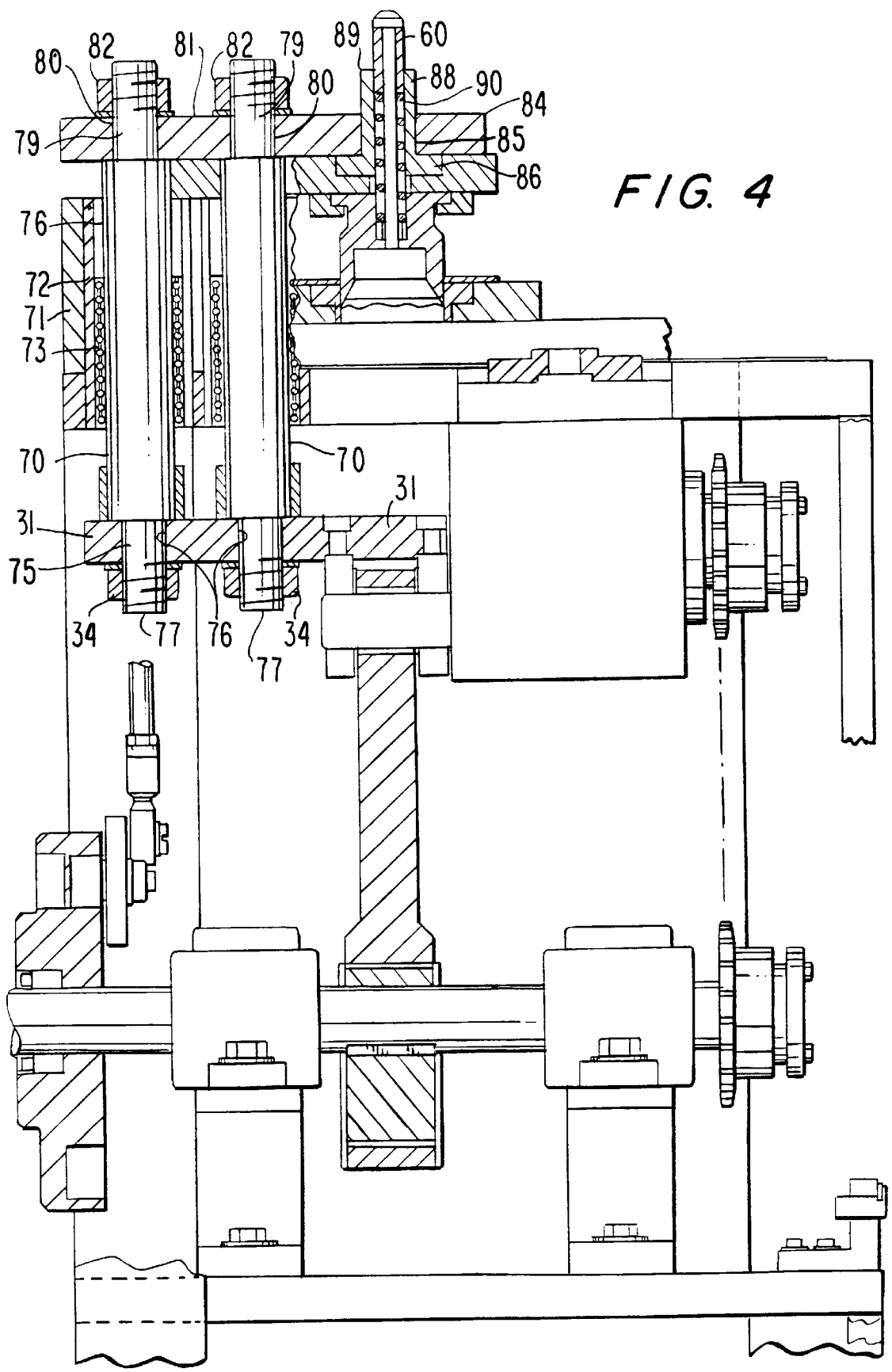
FIG. 4 is a fragmentary schematic sectional view, partly in elevation, showing the side opposite that seen in FIG. 2.

Referring to FIG. 4, there is illustrated a schematic profile of the structure which is supported by the bracket element 31. This support is accomplished by a pair of rods 70 enclosed within outer sleeve 71 and inner sleeve 72 which form a bearing race 73. The lower ends 75 penetrate openings 76 in the element 31 to be secured by bolts 34 which threadedly engage end terminals 77. The upper ends 79 penetrate openings 80 in an upper plate 81 where they are maintained by engaging nuts 82. The upper plate 81 includes a free end 84 having a vertical bore 35 supporting a bearing 86 which surrounds the plunger 60. The lower end 88 of the plunger 60 is slideably disposed within a shroud 89, and is urged upwardly by a spring 90 against the rocker arm 38.

It will be apparent from a consideration of the drawings, that the punch and die element is supported solely by the bracket 31 and rods or posts 70 which are positioned adjacent the periphery of the dial 13. This construction enables a standard punch and die element to be used in conjunction with devices 10 having dials 13 of varying diameters without difficulty. Although not essential, it is preferable that the longitudinal axes of the rods 70 lie in a common plane (not shown) with the axis of the plunger 60 to prevent the possible occurrence of any twisting force generated during operation.

We wish it to be understood that we do not consider the invention to be limited to the precise details of structure shown and described in the specification, for obvious modifications will occur to those skilled in the art to which the invention pertains.

We claim:

1. In a device for inserting liners into container closures, including a rotating dial forming pockets for receiving and discharging individual closures and a work station at which liners are cut from a web of material by a punch and die element operating in synchronized relation with the incremental rotational advancement of said dial to position successive pockets beneath said punch and die element for reception of a liner into a closure carried by said pocket; the improvement comprising: said device including a horizontal platform, said dial being mounted for rotation above said platform; a mounting bracket element, first and second vertically oriented supporting posts, each having a lower end and an upper end; said lower end engaging said bracket element; an upper plate, the upper ends of said posts engaging said upper plate; said upper plate having a free end thereon defining a vertically oriented bore, said punch and die element including a punch member supported within said bore for sliding movement therein; said first and second posts being located adjacent a peripheral edge of said dial.

2. The improvement set forth in claim 1 further comprising a rocker arm for transmitting reciprocating movement to said punch from a timing means, said rocker arm being supported by said mounting bracket.

3. The improvement set forth in claim 1, said first and second posts and said punch having principal longitudinal axes, each of said axes lying in vertical co-planar relation.

* * * * *